• US009488185B2

United States Patent
Kierat

(10) Patent No.: US 9,488,185 B2
(45) Date of Patent: Nov. 8, 2016

(54) EXHAUST GAS TURBOCHARGER

(75) Inventor: Jaroslaw Kierat, Frankenthal (DE)

(73) Assignee: BorgWarner Inc., Auburn Hills, MI (US)

( * ) Notice: Subject to any disclaimer, the term of this patent is extended or adjusted under 35 U.S.C. 154(b) by 695 days.

(21) Appl. No.: 13/988,801

(22) PCT Filed: Nov. 23, 2011

(86) PCT No.: PCT/US2011/062001
§ 371 (c)(1),
(2), (4) Date: May 22, 2013

(87) PCT Pub. No.: WO2012/078364
PCT Pub. Date: Jun. 14, 2012

(65) Prior Publication Data
US 2013/0266425 A1    Oct. 10, 2013

(30) Foreign Application Priority Data

Dec. 8, 2010  (DE) .................. 10 2010 053 797

(51) Int. Cl.
| F04D 29/046 | (2006.01) |
| F04D 29/05 | (2006.01) |
| F01D 25/16 | (2006.01) |
| F01D 25/24 | (2006.01) |
| F02B 39/14 | (2006.01) |
| F02C 6/12 | (2006.01) |
| F16C 33/04 | (2006.01) |
| F16C 33/08 | (2006.01) |

(52) U.S. Cl.
CPC ............ F04D 29/05 (2013.01); F01D 25/166 (2013.01); F01D 25/24 (2013.01); F02B 39/14 (2013.01); F02C 6/12 (2013.01); F05D 2240/50 (2013.01); F05D 2300/20 (2013.01); F05D 2300/21 (2013.01); F16C 33/043 (2013.01); F16C 33/08 (2013.01); F16C 2226/12 (2013.01); F16C 2360/24 (2013.01)

(58) Field of Classification Search
CPC . F04D 29/05; F04D 29/0465; F04D 29/0566
See application file for complete search history.

(56) References Cited

U.S. PATENT DOCUMENTS

| 4,541,786 A * | 9/1985 | McLean ................. F01D 5/284 384/527 |
| 4,927,336 A * | 5/1990 | Rossmann .............. F01D 25/18 417/407 |
| 5,054,940 A | 10/1991 | Momose et al. |
| 7,371,011 B2 * | 5/2008 | McKeirnan, Jr. ....... F01D 25/16 384/504 |
| 2002/0114548 A1 | 8/2002 | Hokkirigawa |
| 2005/0152627 A1 | 7/2005 | Ku et al. |
| 2009/0202343 A1 | 8/2009 | McKeirnan, Jr. |

* cited by examiner

Primary Examiner — Craig Kim
Assistant Examiner — Jason Fountain
(74) Attorney, Agent, or Firm — A. Michael Tucker; Stephan A. Pendorf; Patent Central LLC

(57) ABSTRACT

An exhaust gas turbocharger (1) with a compressor (2) which has a compressor wheel (3) arranged in a compressor housing (4); with a turbine (5) which has a turbine wheel (6) arranged in a turbine housing (7); and with a bearing housing (8) which is arranged between the compressor housing (4) and turbine housing (7); and which has a bearing (9) for a rotor shaft (10) which bears the turbine wheel (6) and the compressor wheel (3), wherein the bearing (9) has at least one ceramic insert (11, 12) which is on the bearing housing side and is under compressive prestress, and at least one ceramic insert (11, 12) which is on the motor shaft side and is under tensile prestress.

6 Claims, 1 Drawing Sheet

EXHAUST GAS TURBOCHARGER

The invention relates to an exhaust gas turbocharger according to the preamble of claim 1.

In the prior art, there are special bearing systems, on which prescribed conditions are imposed, for example a special contamination resistance for the use of certain types of pumps. For these applications, the bearing has to be free from oil. However, in contrast to exhaust gas turbochargers, said pumps are very slow-running.

Bearings lubricated with oil have hitherto been provided in exhaust gas turbochargers of the type in question.

It is therefore the object of the present invention to provide an exhaust gas turbocharger of the type specified in the preamble of claim 1, which makes an oil-free bearing possible.

This object is achieved by the features of claim 1.

The dependent claims contain advantageous developments of the invention.

Lubricants based on hydrocarbons are customarily used in bearing systems of an exhaust gas turbocharger. It is possible to avoid the use of said lubricants by a ceramic sliding bearing being provided as the bearing of the exhaust gas turbocharger. The bearing has two components, namely a monolithic ceramic ring and a shaft sleeve, which is produced from fiber-reinforced ceramic.

With this tribologic system, which is highly robust, it is therefore possible to mount the rotor shaft in an exhaust gas turbocharger without any oil.

The ceramic insert which is under compressive prestress and is on the bearing housing side can be inserted, for example, into a bore in an outside metal ring or directly into the bearing housing bore in order to build up the compressive prestress. For this purpose, for example, the outside metal ring or the material region surrounding the bearing housing bore can be heated. After insertion of the ceramic insert and after cooling of the components, the required compressive prestress is applied.

The tensile prestress for the ceramic insert on the motor shaft side can be produced by means of a press fit on the shaft, for which purpose the shaft, for example, is first of all cooled and then the ceramic insert is placed onto the shaft. After the shaft is heated, the press fit and therefore the tensile prestress are produced.

Although water as lubricant is a preferred solution, any fluids, even air, may in principle be used. In particular, an electrolyte of a fuel cell is also suitable as lubricant.

Figure 1:
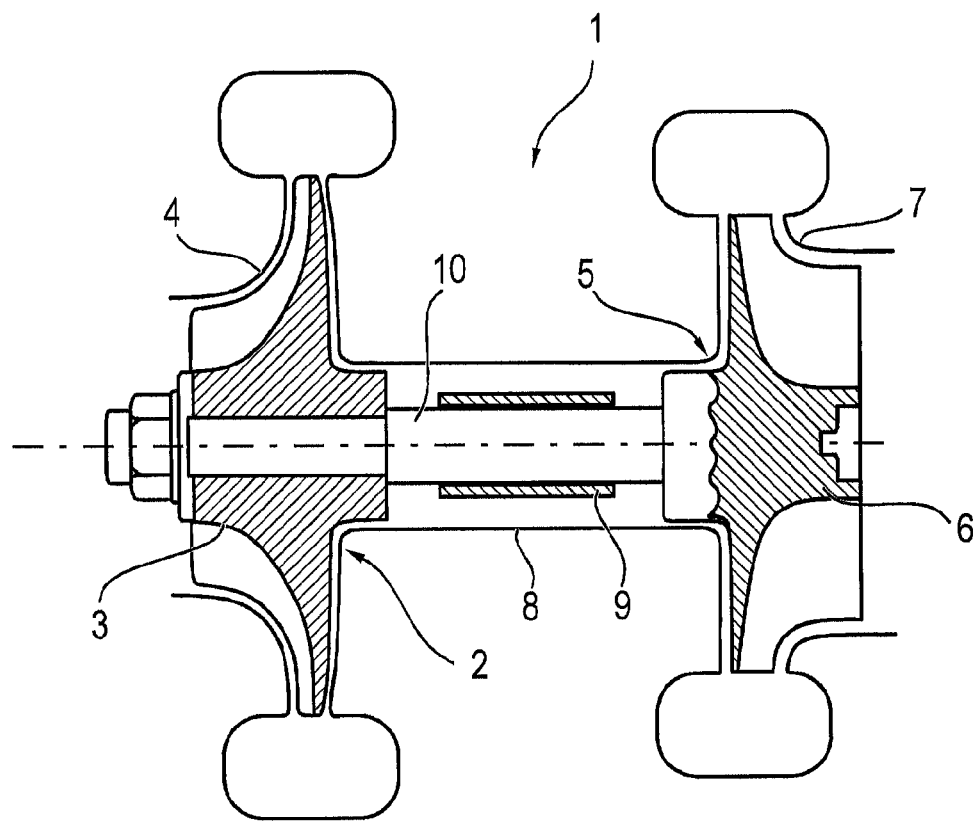
Figure 2:
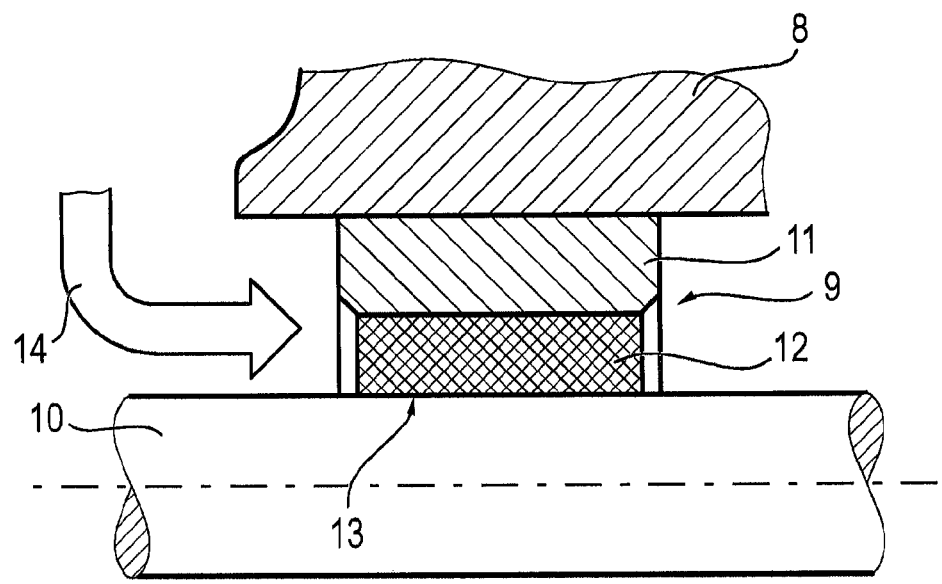

Further details, features and advantages of the invention emerge from the description below of exemplary embodiments with reference to the attached drawing, in which:

FIG. 1 shows a schematically highly simplified illustration of an exhaust gas turbocharger according to the invention for explaining the basic components thereof, FIG. 2 shows a schematically highly simplified illustration of an oil free bearing of the exhaust gas turbocharger according to the invention.

A schematically highly simplified illustration of an exhaust gas turbocharger 1 according to the invention, which has a compressor 2 with a compressor wheel 3 in a compressor housing 4, can be seen in FIG. 1.

The exhaust gas turbocharger 1 furthermore has a turbine 5 which has a turbine wheel 6 in a turbine housing 7.

A bearing housing 8 which receives a bearing 9 for a rotor shaft 10 is arranged between the compressor housing 4 and the turbine housing 7.

Of course, the exhaust gas turbocharger 1 according to the invention also has all of the other components of bearings of this type, but the description of said components is not required for explaining the principles of the present invention.

FIG. 2 shows a schematically highly simplified illustration of the bearing 9 for a rotor shaft 10 which bears the turbine wheel 6 and the compressor wheel 3. The bearing 9 has a ceramic insert 11 on the bearing housing side, and a ceramic insert 12 on the rotor shaft side. The ceramic insert 11 is a monolithic ceramic ring which is fitted under pressure on an outside metal part of the bearing housing 8, with a permanent state of stress being produced in said annular ceramic insert 11.

The ceramic insert 12 on the rotor shaft side is a shaft sleeve which is produced from fiber-reinforced ceramic and is arranged on the rotor shaft 10 by a press fit, as illustrated by the arrow 13 in FIG. 2.

The ceramic inserts 11, 12 of the bearing 9 are provided with oil-free lubrication, since water, which is illustrated schematically in FIG. 2 by the arrow 14, is used as the lubricant.

To complement the above written disclosure of the invention, reference is explicitly made to the graphical illustration in FIGS. 1 and 2.

LIST OF REFERENCE NUMBERS

1 Exhaust gas turbocharger
2 Compressor
3 Compressor wheel
4 Compressor housing
5 Turbine
6 Turbine wheel
7 Turbine housing
8 Bearing housing
9 Bearing
10 Rotor shaft
11, 12 Ceramic insert
13 Press fit
14 Water

The invention claimed is:

1. An exhaust gas turbocharger (1) comprising
a compressor (2) having a compressor wheel (3) arranged in a compressor housing (4);
a turbine (5) having a turbine wheel (6) arranged in a turbine housing (7); and
a metal bearing housing (8) which is arranged between the compressor housing (4) and turbine housing (7); and which has a bearing (9) for a metal rotor shaft (10) which rotor shaft (10) bears the turbine wheel (6) and the compressor wheel (3), wherein
the bearing (9) has at least one ceramic insert (11) which is on the bearing housing side and is under compressive prestress, and at least one fiber-reinforced ceramic sleeve (12) which is fixed on the rotor shaft (10) under tensile prestress.

2. The exhaust gas turbocharger as claimed in claim 1, wherein the bearing housing is metal, and the ceramic insert (11) on the bearing housing side is fixed to a bore in the metal bearing housing (8).

3. The exhaust gas turbocharger as claimed in claim 1, wherein the ceramic sleeve (12) is a shaft sleeve which is fixed on the rotor shaft (10) by a press fit (13).

4. The exhaust gas turbocharger as claimed in claim 1, wherein the ceramic insert (11) on the bearing housing side is produced from monolithic ceramic.

5. The exhaust gas turbocharger as claimed in claim 1, wherein the bearing (9) is lubricated by water (14).

6. The exhaust gas turbocharger as claimed in claim 1, wherein the bearing (9) is lubricated by an electrolyte.

* * * * *